United States Patent

Bishop et al.

Patent Number: 5,698,018
Date of Patent: Dec. 16, 1997

[54] HEAT TRANSFERRING INKJET INK IMAGES

[75] Inventors: John F. Bishop, Rochester, N.Y.; Michael J. Simons, Ruislip, United Kingdom; Mary C. Brick, Webster, N.Y.

[73] Assignee: Eastman Kodak Company, Rochester, N.Y.

[21] Appl. No.: 790,131

[22] Filed: Jan. 29, 1997

[51] Int. Cl.$^6$ .................................. C09D 11/00
[52] U.S. Cl. .................. 106/31.75; 106/31.77; 106/31.78; 106/493; 106/496; 427/395; 101/488
[58] Field of Search ................... 106/493, 496, 106/31.75, 31.77, 368; 427/395; 101/488

[56] References Cited

U.S. PATENT DOCUMENTS

| | | | |
|---|---|---|---|
| 4,486,033 | 12/1984 | Parrotta | 283/94 |
| 5,256,192 | 10/1993 | Liu et al. | 106/21 A |
| 5,397,388 | 3/1995 | Fujioka | 106/28 A |
| 5,488,907 | 2/1996 | Xu et al. | 101/488 |
| 5,514,208 | 5/1996 | Nagai et al. | 106/22 H |

FOREIGN PATENT DOCUMENTS 1527396  10/1978  United Kingdom.

*Primary Examiner*—Deborah Jones
*Assistant Examiner*—Amy M. Harding
*Attorney, Agent, or Firm*—John R. Everett

[57] ABSTRACT

A method of transferring a pigmented image, comprising the steps of:

providing a donor element bearing an inkjet printed image containing one or more heat transferable pigments selected from the group consisting of A. 2-(N-methylcarbamyl)-4-(4-N,N-di-ethylamino-phenylimino)-1,4-naphthoquinone;
B. 2-(N-methylcarbamyl)-4-(4-N,N-di-ethylamino-2-methylphenylimino)-1,4-naphthoquinone;
C. 1-phenyl-3-N,N-dimethylamino-4-(4-N,N-diethylaminobenzylidene)-pyrazoline-5-one;
D. N-ethyl-N-benzyl-3-acetamido-4-(3-methyl-4-cyanoisothiazol-5-ylazo)-aniline;
E. N-(2-((2,6-dicyano-4-methylphenyl)azo)-5-(diethylamino)phenyl}methanesulfonamide;
F. N-(2-((2,6-dicyano-4-methylphenyl)azo)-5-(dipropylamino)phenyl}methanesulfonamide; and contacting the donor element with an image receiving element; and transferring the heat transferable image to the image receiving element by applying heat to the donor element.

6 Claims, No Drawings

HEAT TRANSFERRING INKJET INK IMAGES

FIELD OF THE INVENTION

This invention relates to the field of ink jet printing, particularly heat transferable inkjet ink images.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging.

Transfer of a dye image from a donor surface to a receiver surface is known. In the process a donor bearing a dye image is brought into intimate contact with the receiver and heat and/or pressure is applied to the back surface of the donor thereby causing the dye image to transfer from the donor to the receiver.

U.K. Patent 1,527,396 discloses manufacture of so called transfer print carriers with the aid of sublimable dyestuffs with the ink jet ink process. The sublimable dyestuffs are water insoluble or only sparingly soluble in water.

SUMMARY OF THE INVENTION

The present invention provides a method of transferring a pigmented image, comprising the steps of:

providing a donor element bearing an inkjet printed image containing one or more heat transferable pigments selected from the group consisting of A. 2-(N-methylcarbamyl)-4-(4-N,N-di-ethylamino-phenylimino)-1,4-naphthoquinone;
B. 2-(N-methylcarbamyl)-4-(4-N,N-di-ethylamino-2-methylphenylimino)-1,4-naphthoquinone;
C. 1-phenyl-3-N,N-dimethylamino-4-(4-N,N-diethylaminobenzylidene)-pyrazoline-5-one;
D. N-ethyl-N-benzyl-3-acetamido-4-(3-methyl-4-cyanoisothiazol-5-ylazo)-aniline;
E. N-(2-((2,6-dicyano-4-methylphenyl)azo)-5-(diethylamino)phenyl}methanesulfonamide;
F. N-(2((2,6-dicyano-4-methylphenyl)azo)-5-(dipropylamino)phenyl}methanesulfonamide; and contacting the donor element with an image receiving element to form a laminate; and transferring the heat transferable image to the image receiving element by applying heat to the donor element.

The method is carried out using an inkjet ink set comprising heat transferable cyan, magenta and yellow pigments wherein:

the first ink comprises a carrier and a cyan pigment selected from the group consisting of 2-(N-methylcarbamyl)-4-(4-N,N-diethylaminophenylimino)-1,4-naphthoquinone and 2-(n-methylcarbamyl)-4-(4-N,N-diethylamino-2-methylphenylimino)-1,4-naphthoquinone;

the second ink comprises a carrier and, as the yellow pigment, 1-phenyl-3-N,N-dimethylamino-4-(4-N,N-diethylaminobenzylidene)-pyrazoline-5-one; and the third ink comprises a carrier and a magenta pigment selected from the group consisting of N-ethyl-N-benzyl-3-acetamido-4-(3-methyl-4-cyanoisothiazol-5-ylazo)-aniline, N-(2-((2,6-dicyano-4-methylphenyl)azo)-5-(diethylamino)phenyl)-methanesulfonamide; and N-(2-((2,6-dicyano-4-methylphenyl)azo)-5-(dipropylamino)phenyl)-methanesulfonamide.

DETAILS OF THE INVENTION

The temperature applied to effect transfer of the image is at least 60° C. The temperature should not be so high as to adversely affect the pigments, the donor or the receiver. Thus the upper temperature limit can be easily determined. Adequate pressure is applied to the donor-receiver laminate to affect sufficient physical contact and uniform dye transfer.

The donor element and the image receiving element can be formed from the same substrates. It is desirable that such substrates be flexible. Substrates include bond paper, polymer film, fabric, floor tiles and any other flexible substrate.

Polymer coated image receiving elements, wherein the polymer has a low Tg (less than 50° C.) are particularly useful. Images deposited on these layers exhibit improved water fastness, higher image density and sharpness compared to images deposited on substrates without a polymer coating. Useful polymers include polymers or plasticized polymer layers with Tg less than 60° C. including polycarbonates, polyvinyl chlorides, polyesters, polyvinyl butyral. For best results the polymer composition and the transferred dye should be mutually compatible.

The polymers are coated on the receiver surface by using conventional polymer coating techniques.

The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a useful embodiment, the grinding media can comprise particles, preferably substantially spherical in shape, e.g., beads, consisting essentially of a polymeric resin.

In general, polymeric resins suitable for use as milling media are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin, vinyl chloride polymers and copolymers, polyurethanes, polyamides, poly(tetrafluoroethylenes), e.g., Teflon, and other fluoropolymers, high density polyethylenes, polypropylenes, cellulose ethers and esters such as cellulose acetate, poly(hydroxyethylmethacrylate), poly(hydroxyethyl acrylate), silicone containing polymers such as polysiloxanes and the like. The polymer can be biodegradable. Exemplary biodegradable polymers include poly (lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm$^3$. Higher density resins are especially useful inasmuch as it is believed that these provide more efficient particle size reduction. Especially useful are crosslinked or uncrosslinked polymeric media based on styrene.

Milling can take place in any suitable grinding mill. Suitable mills include an airjet mill, a roller mill, a ball mill, an attritor mill and a bead mill. A high speed mill is particularly useful.

By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, $\pi$, and the impeller diameter. Sufficient milling media velocity is achieved, for example, with Cowles-type saw tooth impeller having a diameter of 40 mm when operated at 9,000 rpm. Useful proportions of the milling media, the pigment, the liquid dispersion medium and dispersant can vary within wide limits and depends, for example, upon the particular material selected and the size and density of the milling media etc. The process can be carried out in a continuous or batch mode.

Batch Milling

A slurry of <100 micron milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

Continuous Media Recirculation Milling

A slurry of <100 micron milling media, liquid, pigment and dispersant may be continuously recirculated from a holding vessel through a conventional media mill which has a media separator screen adjusted to >100 micron to allow free passage of the media throughout the circuit. After milling is complete, the dispersion of active material is separated from the grinding media by simple sieving or filtration.

With either of the above modes the useful amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another important ingredient in the mill grind. Useful dispersants for aqueous ink jet inks include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794.

Other patents referred to above in connection with pigment availability also disclose a wide variety of useful dispersants. The dispersant used in the examples is sodium N-methyl-N-oleoyl taurate (OMT).

The milling time can vary widely and depends upon the pigment, mechanical means and residence conditions selected, the initial and desired final particle size, etc. For aqueous mill grinds using the useful pigments, dispersants, and milling media described above, milling times will typically range from 1 to 100 hours. The milled pigment concentrate is preferably separated from the milling media by filtration.

The aqueous carrier medium is water or a mixture of water and at least one water miscible co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

Ink Preparation

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 10%, preferably approximately 0.1 to 5%, by weight of the total ink composition for most thermal ink jet printing applications.

The amount of aqueous carrier medium is in the range of approximately 70 to 98 weight %, preferably approximately 90 to 98 weight %, based on the total weight of the ink. A mixture of water and a polyhydric alcohol, such as diethylene glycol, is useful as the aqueous carrier medium. In the case of a mixture of water and diethylene glycol, the aqueous carrier medium usually contains from about 30% water/70% diethylene glycol to about 95% water/5% diethylene glycol. Useful ratios are approximately 60% water/

40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or co-solvent, is commonly added to help prevent the ink from drying out or crusting in the orifices of the printhead. A penetrant may also be optionally added to help the ink penetrate the receiving substrate, especially when the substrate is a highly sized paper. A biocide, such as Proxel® GXL from Zeneca Colours may be added at a concentration of 0.005–0.5 weight % to prevent unwanted microbial growth which may occur in the ink over time. Additional additives which may optionally be present in ink jet inks include thickeners, pH adjusters, buffers, conductivity enhancing agents, anti-kogation agents, drying agents, and defoamers.

The ink jet inks are employed in ink jet printing wherein liquid ink drops are applied in a controlled fashion to an ink receptive layer substrate, by ejecting ink droplets from the plurality of nozzles, or orifices, in a print head of ink jet printers. This forms the imaged donor element of this invention Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

EXAMPLES

Example 1

(191–96, cyan)

The following ingredients were added to a 2-L vessel:

| | |
|---|---|
| 405 g | polymeric beads, mean diameter of 50 μm (milling media) |
| 335.6 g | de-ionized water (liquid carrier medium) |
| 10.61 g | polyvinylpyrrolidone (Luviskol K-30 manufactured by BASF |
| 46.8 g | cyan colorant 2-(N-methyl carbamoyl)-4-(4-N,N-diethylaminophenylimino)-1,4-naphtho-quinone |
| 4 drops | Proxel GXL biocide-17% active (available from Zeneca Inc.) |

These ingredients were mixed and blended using a high shear "Cowles" type mixer for 24 hours using a 50 mm diameter "Cowles" blade rotating at a speed of 5000 RPM. After 24 hours of mixing, 50 grams of additional beads were added to the mixture and the impeller speed was set to 7000 RPM for an additional 24 hours. At the end of the milling cycle 250 grams of de-ionized water was added and the mixture was filtered through a 5 micron filter to separate the liquid slurry from the polymeric media.

This pigment slurry was diluted to 6.2 weight percent pigment with de-ionized water. 100 grams of this slurry was blended with 77 grams of the following solution:

| | |
|---|---|
| 11.6% | diethylene glycol |
| 11.6% | glycerol |
| 1.76% | Luviskol K-30 |
| 75.0% | de-ionized water |

This ink was filtered through a 1.2-μm filter and loaded in an ink-jet cartridge (model 51626A) manufactured by Hewlett-Packard Inc. The ink cartridge was loaded into an ink jet printer (Hewlett-Packard Model 550C), and an image was printed on bond paper donor (manufactured by Hammermill Inc. and identified as Fore®DP). The printed image was placed in contact with receiver element of cotton fabric (50% polyester/50% cotton white T-shirt of Golden Blend by Fruit of the Loom), and the composite was placed in a commercial heat-sealing press (Model #220 made by Insta Machine Corp. of South Gate, Calif.) for 16 seconds at a preset temperature of 350° F. The fabric receiver was separated from the donor and image densities were (Dmax) on the receiver and the processed donor were measured. This image transfer step was repeated with a new donor to similar fabric, except a clear layer of a low Tg polymer (<50° C. Tg) was heat-transferred to the fabric before the colorant was transferred. The polymer layer was transferred to the fabric similarly using the same press heated to 350° F. and a heat treatment time of 8 seconds. The reflection densities (status A) of the fabric receiver and used donor were measured.

| Element (191-96, CYAN) | Cyan Optical Density |
|---|---|
| DONOR (before transfer) | 1.09 |
| FABRIC RECEIVER (before transfer, cloth only) | 0.08 |
| FABRIC RECEIVER (before transfer, polycoated-fabric) | 0.09 |

| Element (191-96, CYAN) | Cyan Optical Density |
|---|---|
| FABRIC RECEIVER (after transfer, cloth only) | 0.63 |
| FABRIC RECEIVER (after transfer, polycoated-fabric) | 1.12 |

This data shows the improved image density obtained on a polymer coated image receiving element

EXAMPLE 2

(191-91, yellow)

The following ingredients were added to a 2 liter vessel:

31.2 g yellow colorant (1-phenyl-3-N,N-dimethyl-amino-4-(4-N,N-diethylaminobenzylidene)-pyrazoline-5-one)

| 3.84 g | Luviskol K-30 |
| 0.48 g | Surfactant 10G (10% active solution-available from Olin Chemical Co.) |
| 204.3 g | de-ionized water |
| 0.14 g | Proxel GXL (17% active) |
| 353.0 g | polymeric beads (50 µm diameter-20% styrene-80% divinylbenzene copolymer) |

This mixture was agitated with a high shear "Cowles" type impeller (50 mm diameter) at 6000 RPM for 67 hours. During the processing cycle, water and dispersants were added to achieve laminar fluid flow and colloidal stability of the dispersed pigment phase. These addenda include:

| 7.06 g | Luviskol K-30 |
| 1.72 g | Surfactant 10G (10% active) |
| 297.9 g | de-ionized water |
| 0.3 g | OMT |

The final slurry composition (excluding the milling beads) after processing was

| 31.2 g | 1-phenyl-3-N,N-dimethylamino-4-(4-N,N-diethylaminobenzylidene)-pyrazoline-5-one |
| 10.9 g | Luviskol K-30 |
| 0.3 g | OMT |
| 2.2 g | Surfactant Olin 10G (10% active in water) |
| 502.2 g | de-ionized water |
| 0.14 g | Proxel GXL (17% active) |

At the end of the milling cycle the mixture was filtered through a 5-µm filter to separate the liquid slurry from the polymeric media. This slurry was used to prepare an ink-jet printable ink. The ink was prepared by combining the following ingredients and hand shaking this ink mixture:

| 30.7 g | 5.7% yellow pigment slurry |
| 2.5 g | glycerol |
| 2.5 g | diethylene glycol |
| 19.3 g | de-ionized water |

The ink was filtered with a 1.2-µm filter and loaded in an HP51626A print cartridge and printed and processed as in example 1. The density of the printed and transferred images were measured like example 1.

| Element (191-91, YELLOW) | Yellow Optical Density |
|---|---|
| DONOR (before transfer) | 1.06 |
| FABRIC RECEIVER (before transfer, cloth only) | 0.02 |
| FABRIC RECEIVER (before transfer, polycoated-fabric) | 0.03 |
| FABRIC (after transfer, cloth only) | 0.73 |
| FABRIC RECEIVER (after transfer, polycoated-fabric) | 1.27 |

Example 3

(191-92 magenta)

The following ingredients were added to a 2-L vessel with slow speed propeller agitation (<250 RPM):

| 353.0 g | polymeric beads (50 µm diameter-20% styrene-80% divinylbenzene copolymer) |
| 31.2 g | magenta colorant N-ethyl-N-benzyl-3-acetamido-4-(3-methyl-4-cyanoisothiazol-5-ylazo)-aniline |
| 0.30 g | Syn Fac 8210 (manufactured by Milliken Chemical Co.) |
| 205.5 g | deionized water |
| 4 drops | Proxel GXL (17% active) |

After the ingredients a homogeneous mixture was achieved, the mixture was agitated with a high shear "Cowles" type impeller (40 mm diameter) at 6500 RPM for 27 hours. During the processing cycle, the following addenda were added to achieve laminar fluid flow and colloidal stability of the dispersed pigment.

| 290 g | de-ionized water |
| 3.27 g | Syn Fac 8210 |
| 0.87 g | Surfactant 10G |
| 0.37 g | OMT |

At the end of the milling cycle this mixture was filtered through a 5-µm filter to separate the liquid slurry from the polymeric media. This slurry was used to prepare an ink-jet ink. The ink was prepared by combining the following ingredients and hand shaking this mixture:

| 19.66 g | pigment slurry |
| 2.5 g | glycerol |
| 2.5 g | diethylene glycol |
| 25.34 g | de-ionized water |

The ink formula was filtered with a 1.2-µm syringe filter and loaded into an ink jet cartridge. The ink was printed and processed as in example 1. The density of the printed and transferred images were measured as in example 1.

| Element (191-92, Magenta) | Magenta Optical Density |
|---|---|
| DONOR (before transfer) | 1.09 |
| FABRIC RECEIVER (before transfer, cloth only) | 0.09 |
| FABRIC RECEIVER (before transfer, polycoated-fabric) | 0.08 |

-continued

| Element (191-92, Magenta) | Magenta Optical Density |
|---|---|
| FABRIC RECEIVER (after transfer, cloth only) | 0.35 |
| FABRIC RECEIVER (after transfer, polycoated-fabric) | 1.49 |

Again the polymer coated image receiving element provides improved image density.

This invention has been described with particular reference to preferred embodiments thereof but it will be understood that modifications can be made within the spirit and scope of the invention.

We claim:

1. A method of transferring a pigmented image, comprising the steps of:

providing a donor element bearing an ink jet printed image containing one or more heat transferable pigments selected from the group consisting of A. 2-(N-methylcarbamyl)-4-(4-N,N-di-ethylamino-phenylimino)-1,4-naphthoquinone;
B. 2-(N-methylcarbamyl)-4-(4-N,N-di-ethylamino-2-methylphenylimino)-1,4-naphthoquinone;
C. 1-phenyl-3-N,N-dimethylamino-4-(4-N,N-diethylaminobenzylidene)-pyrazoline-5-one;
D. N-ethyl-N-benzyl-3-acetamido-4-(3-methyl-4-cyanoisothiazol-5-ylazo)-aniline;
E. N-(2-((2,6-dicyano-4-methylphenyl)azo)-5-(diethylamino)phenyl}methanesulfonamide;
F. N-(2((2,6-dicyano-4-methylphenyl)azo)-5-(dipropylamino)phenyl}methanesulfonamide; and contacting the donor element with an image receiving element; and transferring the image to the image receiving element by applying heat to the donor element.

2. The method of claim 1 wherein the image contains one or more heat transferable pigments selected from the group consisting of:

A. 2-(N-methylcarbamyl)-4-(4-N,N-di-ethylamino-phenylimino)-1,4-naphthoquinone;
B. 1-phenyl-3-N,N-dimethylamino-4-(4-N,N-diethylaminobenzylidene)-pyrazoline-5-one; and
C. N-ethyl-N-benzyl-3-acetamido-4-(3-methyl-4-cyanoisothiazol-5-ylazo)-aniline.

3. The method of claim 1 or 2 wherein the temperature is at least 60° C.

4. The method of claim 1 or 2 wherein the image receiving element is overcoated with a polymer having a Tg of less than 50° C.

5. A color ink jet ink set comprising heat transferable cyan, magenta and yellow pigments wherein:

the first ink comprises a carrier and a cyan pigment selected from the group consisting of 2-(N-methylcarbamyl)-4-(4-N,N-di-ethylaminophenylimino)-1,4-naphthoquinone and 2-(N-methylcarbamyl)-4-(4-N,N-di-ethylamino-2-methylphenylimino)-1,4-naphthoquinone;

the second ink comprises a carrier and, as the yellow pigment, 1-phenyl-3-N,N-dimethylamino-4-(4-N,N-diethylaminobenzylidene)-pyrazoline-5-one; and the third ink comprises a carrier and a magenta pigment selected from the group consisting of N-ethyl-N-benzyl-3-acetamido-4-(3-methyl-4-cyanoisothiazol-5-ylazo)-aniline, N-(2-((2,6-dicyano-4-methylphenyl)azo)-5-(diethylamino)phenyl)-methanesulfonamide; and N-(2-((2,6-dicyano-4-methylphenyl)azo)-5-(dipropylamino)phenyl)-methanesulfonamide.

6. A color ink jet ink set according to claim 5 comprising the transferable cyan, magenta and yellow pigments wherein:

the first ink comprises a carrier and, as the cyan pigment, 2-(n-methylcarbamyl)-4-(4-N,N-di-ethylaminophenylimino)-1,4-naphthoquinone;

the second ink comprises a carrier and, as the yellow pigment, 1-phenyl-3-N,N-dimethylamino-4-(4-N,N-diethylaminobenzylidene)-pyrazoline-5-one; and the third ink comprises a carrier and, as the magenta pigment, N-ethyl-N-benzyl-3-acetamido-4-(3-methyl-4-cyanoisothiazol-5-ylazo)-aniline.

* * * * *